United States Patent [19]
Schneider

[11] Patent Number: 6,116,671
[45] Date of Patent: *Sep. 12, 2000

[54] LOW PROFILE SLIDE-OUT OPERATING MECHANISM FOR EXPANDABLE VEHICLE ROOM

[75] Inventor: Robert H. Schneider, Beaver Dam, Wis.

[73] Assignee: Applied Power Inc., Butler, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/823,170

[22] Filed: Mar. 25, 1997

Related U.S. Application Data

[63] Continuation-in-part of application No. 08/563,043, Nov. 27, 1995, Pat. No. 5,758,918.

[51] Int. Cl.[7] ............................................ B60P 3/34
[52] U.S. Cl. ............................ 296/26.01; 296/26.13; 296/175; 52/67; 74/30
[58] Field of Search ....................... 296/26.08, 26.09, 296/26.1, 26.12, 26.13, 26.14, 165, 170, 171, 173, 175, 26.01; 52/67; 74/30

[56] References Cited

U.S. PATENT DOCUMENTS

| | | | |
|---|---|---|---|
| 1,419,475 | 6/1922 | Smith | 296/26.13 |
| 1,521,635 | 1/1925 | Lewis | 52/67 |
| 2,581,192 | 1/1952 | La Fleur | 20/2 |
| 2,842,972 | 7/1958 | Houdart | 74/422 |
| 2,902,312 | 9/1959 | Ferrera . | |
| 3,137,041 | 6/1964 | Mullen | 52/67 |
| 3,169,280 | 2/1965 | Jarman | 20/2 |
| 3,596,416 | 8/1971 | Hojka | 52/64 |
| 3,884,520 | 5/1975 | Peterson . | |
| 4,128,269 | 12/1978 | Stewart . | |
| 4,133,571 | 1/1979 | Fillios . | |
| 4,253,283 | 3/1981 | May | 52/67 |
| 4,413,855 | 11/1983 | Flanagan | 296/162 |
| 4,480,866 | 11/1984 | Komatsu | 296/21 |
| 4,500,132 | 2/1985 | Yoder | 296/171 |
| 4,869,030 | 9/1989 | Clark | 52/79.6 |
| 4,883,306 | 11/1989 | Stucky | 296/162 |
| 4,950,123 | 8/1990 | Brockhaus | 296/26.09 X |
| 4,955,661 | 9/1990 | Mattice | 296/171 |
| 5,050,927 | 9/1991 | Montanari | 296/165 |
| 5,090,749 | 2/1992 | Lee | 296/171 |
| 5,092,650 | 3/1992 | Perlot | 296/190 |
| 5,127,697 | 7/1992 | St. Marie . | |
| 5,154,469 | 10/1992 | Morrow . | |
| 5,237,782 | 8/1993 | Cooper | 52/67 |
| 5,248,180 | 9/1993 | Hussaini | 296/171 |
| 5,295,430 | 3/1994 | Dewald, Jr. et al. | 92/165 |
| 5,332,276 | 7/1994 | Blodgett, Jr. . | |
| 5,333,420 | 8/1994 | Eden | 52/67 |
| 5,491,933 | 2/1996 | Miller et al. | 52/67 |
| 5,758,918 | 6/1998 | Schneider et al. | 296/26.13 |

FOREIGN PATENT DOCUMENTS

| | | |
|---|---|---|
| 0 083 317 | 7/1983 | European Pat. Off. . |
| 1084747 | 1/1955 | France . |
| 1 574 680 | 6/1969 | France ................. 296/171 |
| 485330 | 5/1938 | United Kingdom . |

*Primary Examiner*—Dennis H. Pedder
*Attorney, Agent, or Firm*—Quarles & Brady LLP

[57] ABSTRACT

A low profile operating mechanism for selectively extending and retracting a slide-out section of a vehicle body includes a pair of substantially parallel outer rails secured to the vehicle body. Each of the outer rails has an inner end and an outer end. A pair of substantially parallel inner rails are provided for supporting the slide-out section thereon. Each of the inner rails are slidably mounted for longitudinal movement within one of the outer rails. A drive arrangement is secured to the outer ends of each outer rail for selectively moving the inner rails into and out of the outer rails to extend and retract the slide-out section of the vehicle body. The drive arrangement is constructed and arranged to define rearwardly thereof a relatively unobstructed storage space beneath the vehicle body.

21 Claims, 4 Drawing Sheets

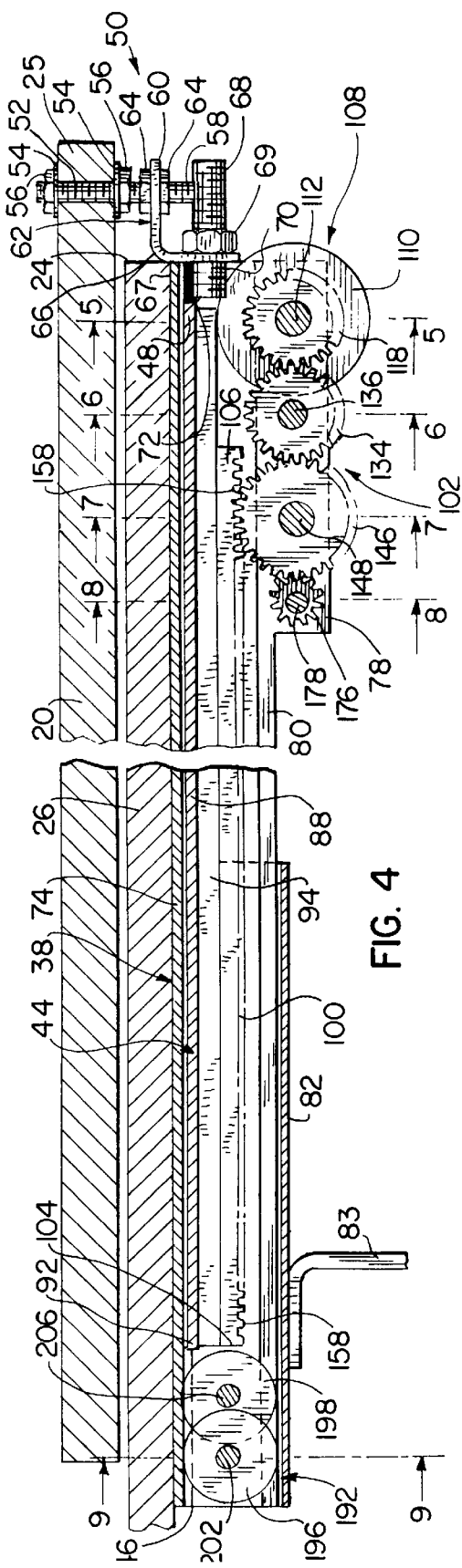
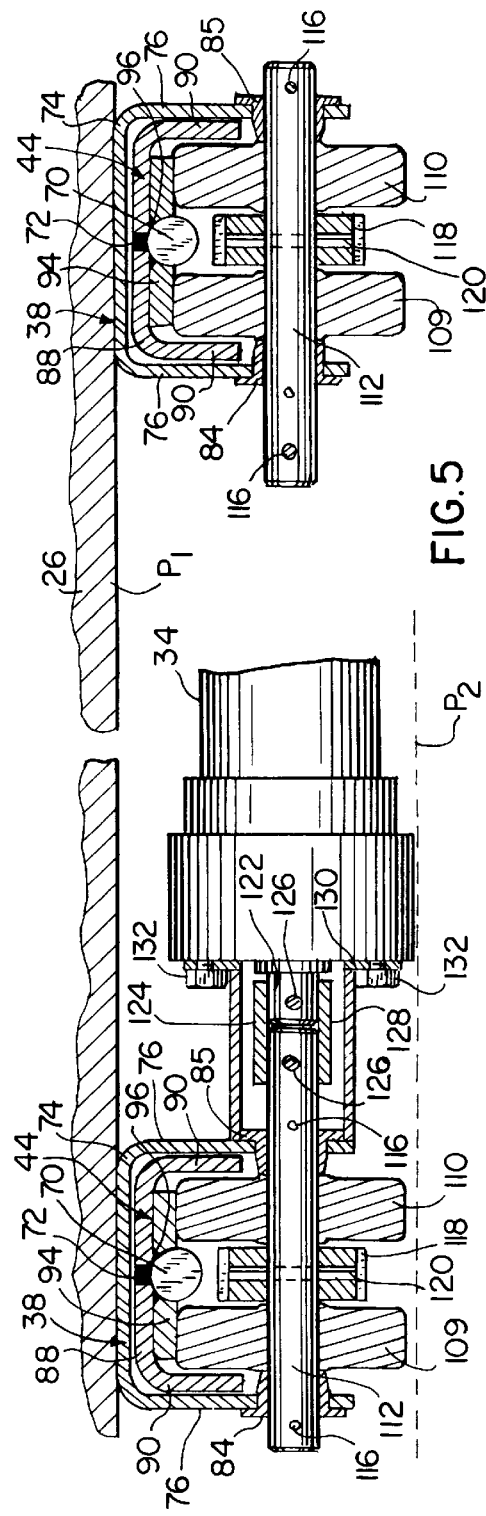
FIG. 4
FIG. 5

6,116,671

LOW PROFILE SLIDE-OUT OPERATING MECHANISM FOR EXPANDABLE VEHICLE ROOM

CROSS-REFERENCE TO RELATED APPLICATIONS

This is a continuation-in-part of U.S. patent application Ser. No. 08/563,043 filed Nov. 27, 1995, which issued as U.S. Pat. No. 5,758,918 entitled "Vehicle Room Slide-Out Operating Mechanism" on Jun. 2, 1998.

FIELD OF THE INVENTION

This invention relates broadly to the field of expandable vehicles and, more particularly, pertains to a low profile slide-out operating mechanism for selectively extending and retracting a slide-out section of a trailer or recreational vehicle.

BACKGROUND OF THE INVENTION

In order to increase the available interior space of recreational vehicles or trailers, slide-out rooms or sections can be made integral with the structure of the vehicle or trailer. During transit, these rooms can be retracted and stored in the interior of the vehicle or trailer, with the exterior wall of the slide-out room approximately flush with the exterior of the vehicle or trailer. To use the slide-out room, the vehicle is first parked and leveled. Using an operating mechanism located beneath the body of the vehicle, the slide-out room is then slid outward from the vehicle, increasing the interior space of the vehicle.

The present invention relates to an improvement of the slide-out operating mechanism disclosed in U.S. Pat. No. 5,758,918 entitled "Vehicle Room Slide-Out Operating Mechanism" which issued Jun. 2, 1998, the disclosure of which is hereby incorporated by reference. In that application, the operating mechanism includes a pair of substantially parallel, generally rectangular outer rail members secured to the vehicle body. A pair of substantially parallel, generally rectangular inner rail members provided for supporting a slide-out section thereon are slidably mounted for longitudinal movement within the outer rail members. An upper roller arrangement is rotatably mounted at the inner end of each inner rail member and is engageable with the outer rail member. A lower roller arrangement is rotatably mounted on the vehicle body outside each of the outer rail members and is engageable with one of the inner rail members. Each of the inner rail members has a gear rack depending from the bottom thereof and extending longitudinally thereon. A drive arrangement is mounted to the vehicle body and includes a gear arrangement engageable with each of the gear racks. The drive arrangement includes a common drive shaft interconnecting each of the gear arrangements such that actuation of the drive arrangement, such as by an integral motor-brake, will cause rotation of the gear arrangement and movement of the gear racks to move the inner rail members into and out of the outer rail members. An override system is slidably mounted on the drive shaft for rotating the gear arrangement and drive shaft should the drive arrangement become inoperable.

While the above-described operating mechanism is satisfactory in many slide-out environments, there are expandable trailers and recreational vehicles which are provided with miscellaneous compartments such as for storing luggage or water beneath the vehicle chassis. In arrangements such as these, it is desirable to employ an elevated slide-out operating mechanism which will provide sufficient head room below the vehicle so as to more conveniently access the undercarriage compartments, and create a better pathway to the drive arrangement and override system.

It is an object of the present invention to provide an operating mechanism for a slide-out section of a trailer or recreational vehicle which comprises a more compact arrangement of nested inner and outer rail members and a raised gear rack. Another object of the invention is to provide an operating mechanism which creates a relatively unobstructed storage space rearwardly of the drive shaft and between the outer rail members. Yet another object of the invention is to provide an operating mechanism having a meshing rotatable gear arrangement engageable with the gear rack and supported on a series of parallel stub shafts at a heightened position. A further object of the invention is to provide an operating mechanism having a reduced weight which is reflected in improved fuel economy of the carrier vehicle and lessened energy required to extend and retract the slide-out section. Still another object of the invention is to provide an operating mechanism having improved roller arrangements which will ensure a low friction sliding operation without binding or misalignment problems. Yet another object of the invention is to provide an operating mechanism having an improved drive arrangement which will enable smooth, uniform and responsive movement as well as positive locking of the slide-out section.

SUMMARY OF THE INVENTION

The present invention advantageously provides a low profile operating mechanism for an expandable trailer or vehicle body specifically constructed to improve the access to equipment beneath the vehicle body while maintaining movement of a slide-out section in a low friction, smoothly actuated and cost-effective embodiment.

One aspect of the invention contemplates a low profile operating mechanism for selectively extending and retracting a slide-out section of a vehicle body. The mechanism includes a pair of substantially parallel outer rails secured to the vehicle body, each of the outer rails having an inner end and an outer end. A pair of substantially parallel inner rails is provided for supporting the slide-out section thereon, each of the inner rails being slidably mounted for longitudinal movement within one of the outer rails. A drive arrangement is secured to the outer ends of each outer rail for selectively moving the inner rails in and out of the outer rails to extend and retract the slide-out section on the vehicle body. The drive arrangement is constructed and arranged to define rearwardly thereof a relatively unobstructed storage space beneath the vehicle body. The drive arrangement includes a meshing multiple gear arrangement rotatably secured at the outer end of each outer rail, a drive shaft assembly connected between each of the meshing multiple gear arrangements, and a device for rotating each meshing multiple gear arrangement. The device for rotating each meshing multiple gear arrangement is an automated motive device or a manually rotatable tool.

In another aspect of the invention, an operating mechanism for selectively extending and retracting a slide-out section of a vehicle body has a pair of substantially parallel outer rails secured to the vehicle body and a pair of substantially parallel inner rails supporting the slide-out section thereon. Each of the inner rails and each of the outer rails has respective top walls, sidewalls and outer ends. Each of the inner rails is slidably mounted for longitudinal movement within one of the outer rails. A drive arrangement is provided for moving the inner rails in and out of the outer rails. The improvement resides in a gear rack supported from the top wall of each of the inner rails and a multiple gear arrangement comprising a series of meshing gears rotatably secured to the outer ends of each of the outer rails and operably connected to the drive arrangement, a portion of the multiple gear arrangement being engageable with the gear rack. Each of the meshing gears has a rotational axis lying in a substantially horizontal plane passing through the center of each of the meshing gears. The multiple gear arrangement comprises an input gear, an idler gear engageable with the input gear, a drive gear engageable with the idler gear and an override gear engageable with the drive gear. The input gear, the idler gear, the drive gear and the override gear are each mounted for rotation on a respective gear stub shaft extending between the sidewalls of the outer rails. A support rail is interposed between the top wall of the inner rail and the gear rack. A set of lower support rollers is engageable with the support rail, each of the lower support rollers being mounted on the input gear stub shaft between one of the sidewalls of the inner rail and the input gear. A set of upper support rollers is engageable with the top wall of each of the outer rails when the slide-out section is retracted, each of the upper support rollers being mounted on an upper support roller stub shaft secured in the sidewalls of each of the inner rails. The upper support rollers are engageable with a belly pan attached to the sidewalls of each of the outer rails during extension of the slide-out section. The sidewalls of each of the outer rails are longer than the sidewalls of each of the inner rails. The rotational axes of the input gear stub shaft, the idler gear stub shaft, the drive gear stub shaft, the override gear stub shaft, and the upper support roller stub shaft are all parallel to each other. The drive arrangement is comprised of an electric motor-brake having an output shaft coaxially secured to the respective stub shaft of the input gear, or alternatively comprised of a manually rotatable tool having a shaft coaxially secured to the respective stub shaft of the override gear.

Yet another aspect of the invention contemplates an operating mechanism for selectively extending and retracting a slide-out section of the vehicle body. The mechanism comprises a pair of substantially parallel, inverted U-shaped outer channels secured to the vehicle body. Each of the outer channels has a top wall and depending sidewalls, the depending sidewalls defining a mounting surface at an outer end of each outer channel. A pair of substantially parallel, inverted U-shaped inner channels is provided for supporting the slide-out section thereon. Each of the inner channels has a top wall disposed beneath the top wall of one of the outer channels, and depending sidewalls positioned inside of the depending sidewalls of the outer channel, the depending sidewalls of each inner channel being shorter than the depending sidewalls of each outer channel. A gear rack is fixed to the top wall of each of the inner channels and a series of meshing gears is rotatably secured to the mounting surface of the depending sidewalls of the outer channels, at least one of the meshing gears being engageable with the gear rack. A drive arrangement is operably connected to one of the meshing gears to move the inner channels into and out of the outer channels so as to extend and retract the slide-out section.

In still another aspect of the invention, an operating mechanism for selectively extending and retracting a slide-out section of a vehicle body comprises a pair of substantially parallel outer rails secured to the vehicle body, each of the outer rails having an inner end and an outer end. A pair of substantially parallel inner rails is provided for supporting the slide-out section thereon, each of the inner rails being slidably mounted for longitudinal movement within one of the outer rails.

Each of the inner rails has an inner end, and an outer end attachable to the slide-out section. A support rail is supported from each of the inner rails and an upper roller arrangement is rotatably mounted at each of the inner ends of the slidable inner rails and engageable with one of the outer rails. A lower roller arrangement is rotatably mounted at each of the outer ends of the outer rails and is engageable with the support rail. A drive arrangement is provided for moving the inner rails into and out of the outer rails. The drive arrangement includes a gear rack provided on the support rail, a meshing rotatable gear arrangement engageable with each of the gear racks, and a device for rotating the meshing rotatable gear arrangement. The upper roller arrangement comprises a set of three rollers mounted at the inner end of each inner rail for engagement with the outer rail. The lower roller arrangement comprises a pair of rollers mounted on the outer rails and engageable with the support rails.

In yet a further aspect of the invention, a master-slave operating mechanism for selectively extending and retracting the slide-out section of a vehicle body includes a pair of substantially parallel, inverted U-shaped outer channels secured to the vehicle body. Each of the outer channels has a top wall and depending sidewalls, the depending sidewalls defining a mounting surface at an outer end of each outer rail. A pair of substantially parallel, inverted U-shaped inner channels is provided for supporting the slide-out section thereon. Each of the inner channels has a top wall disposed beneath the top wall of one of the outer channels and depending sidewalls positioned inside each of the depending sidewalls of each outer channel. The depending sidewalls of each inner channel are shorter than the depending sidewalls of each outer channel. A gear rack is fixed to the top wall of each of the inner channels. An input gear is mounted for rotation with and upon an input stub shaft rotatably mounted on each mounting surface. An idler gear in meshing engagement with the input gear is mounted for rotation with and upon an idler stub shaft rotatably mounted on each mounting surface. A drive gear in meshing engagement with the idler gear is mounted for rotation with and upon a drive stub shaft rotatably mounted on each mounting surface, the drive gear being engageable with the gear rack. An override gear in meshing engagement with the drive gear is mounted for rotation with and upon an override stub shaft rotatably mounted on each mounting surface. A drive shaft assembly extends between each of the drive gears. A drive arrangement for rotating each of the input gears is provided so as to rotate one of the drive gears, the drive shaft assembly transmitting the rotational movement of the one drive gear to the other drive gear causing the simultaneous rotation of the drive gears against the gear racks enabling the inner rails to slide into and out of the outer rails thereby extending and retracting the slide-out section.

Various other objects, features and advantages of the invention will be made apparent from the following description taken together with the drawings.

BRIEF DESCRIPTION OF THE DRAWINGS

The drawings illustrate the best mode presently contemplated in carrying out the invention.

In the drawings:

FIG. 4 is an enlarged partial, sectional view taken on line 4—4 of FIG. 3, and showing the slide-out operating mechanism in its retracted position;

FIG. 5 is an enlarged partial, sectional view taken on line 5—5 of FIG. 4, and showing the drive motor-brake, input gear and lower roller arrangements of the low profile slide-out operating mechanism of FIG. 3;

DETAILED DESCRIPTION OF THE INVENTION

The present invention provides an expandable section attached to a known trailer or recreational vehicle which provides distinct advantages over the prior art as will be described and appreciated hereafter. In the preferred embodiment, the trailer or recreational vehicle (generally referred to as the vehicle) is equipped with a laterally adjustable wing or slide-out section used to provide additional interior room. However, it should be understood that the invention can also apply to expandable sections or compartments provided on other vehicles for use in construction, military, medical, education, mobile broadcast, and other applications to expand the inside volume of the vehicle.

Figure 1:
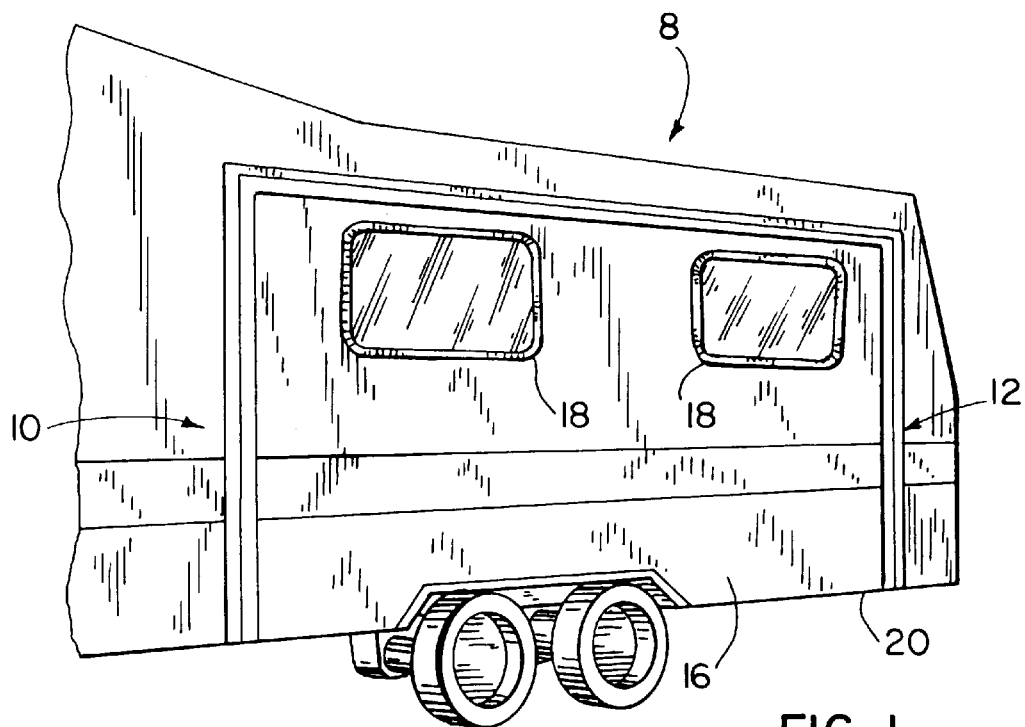
FIG. 1 is a partial, perspective view of a trailer or recreational vehicle having a slide-out room section and a stationary room section, and employing the low profile, slide-out operating mechanism of the present invention showing the slide-out room section in a retracted position relative to the stationary room section.
Figure 2:
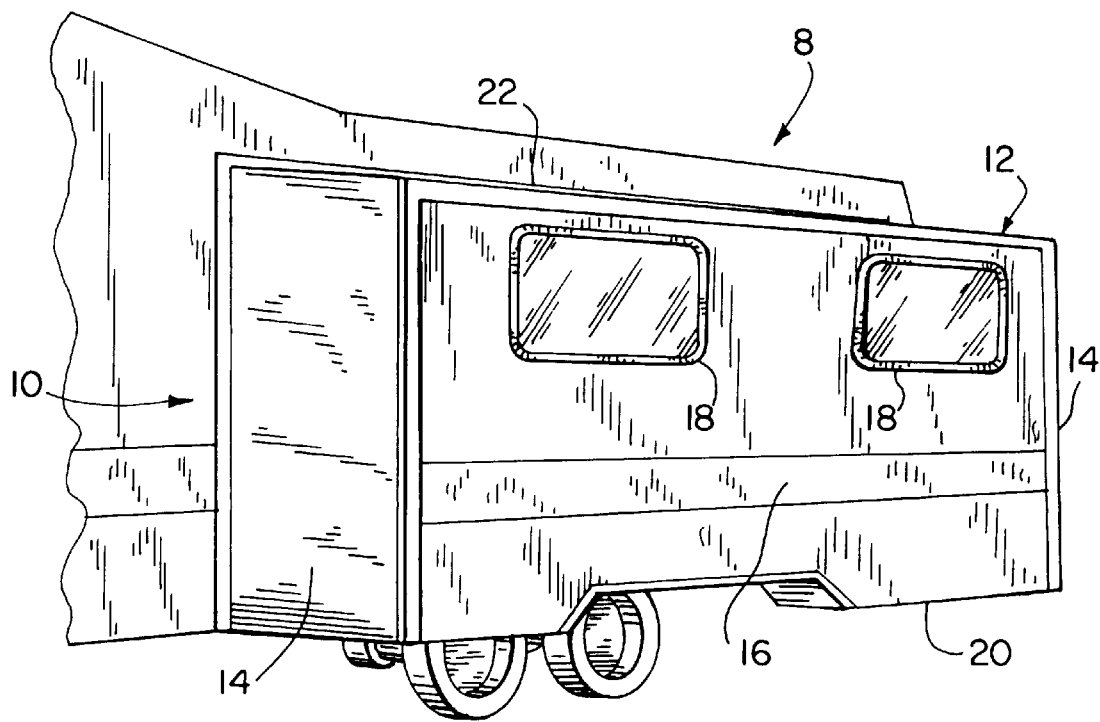
FIG. 2 is a partial, perspective view of the trailer or recreational vehicle of FIG. 1 showing the slide-out room section in an extended position.

Referring now to the drawings, FIG. 1 illustrates a side perspective view of a vehicle body 8 having mounted thereon a stationary room section 10 and an expandable telescopic, slide-out section 12 of the present invention in its fully retracted position. FIG. 2 is a similar view with the slide-out section 12 fully extended or expanded. Slide-out section 12 is rectangularly configured and includes a pair of parallel end walls 14, a front wall 16 with two windows 18, a floor 20 and a roof 22. As seen in the plan view of FIG. 3, floor 20 of slide-out section 12 is movable with respect to the outer end 24 of a fixed floor 26 of stationary room section 10 from a retracted position to a partially extended position shown in phantom lines A on one side of the arrow and towards the fully extended position shown in phantom lines B on the other side of the arrow. The invention resides in a low profile arrangement which is adapted to be mounted beneath the vehicle body 8 for supporting and controlling movement of slide-out section 12 relative to the stationary room section 10 in the following manner.

Figure 3:
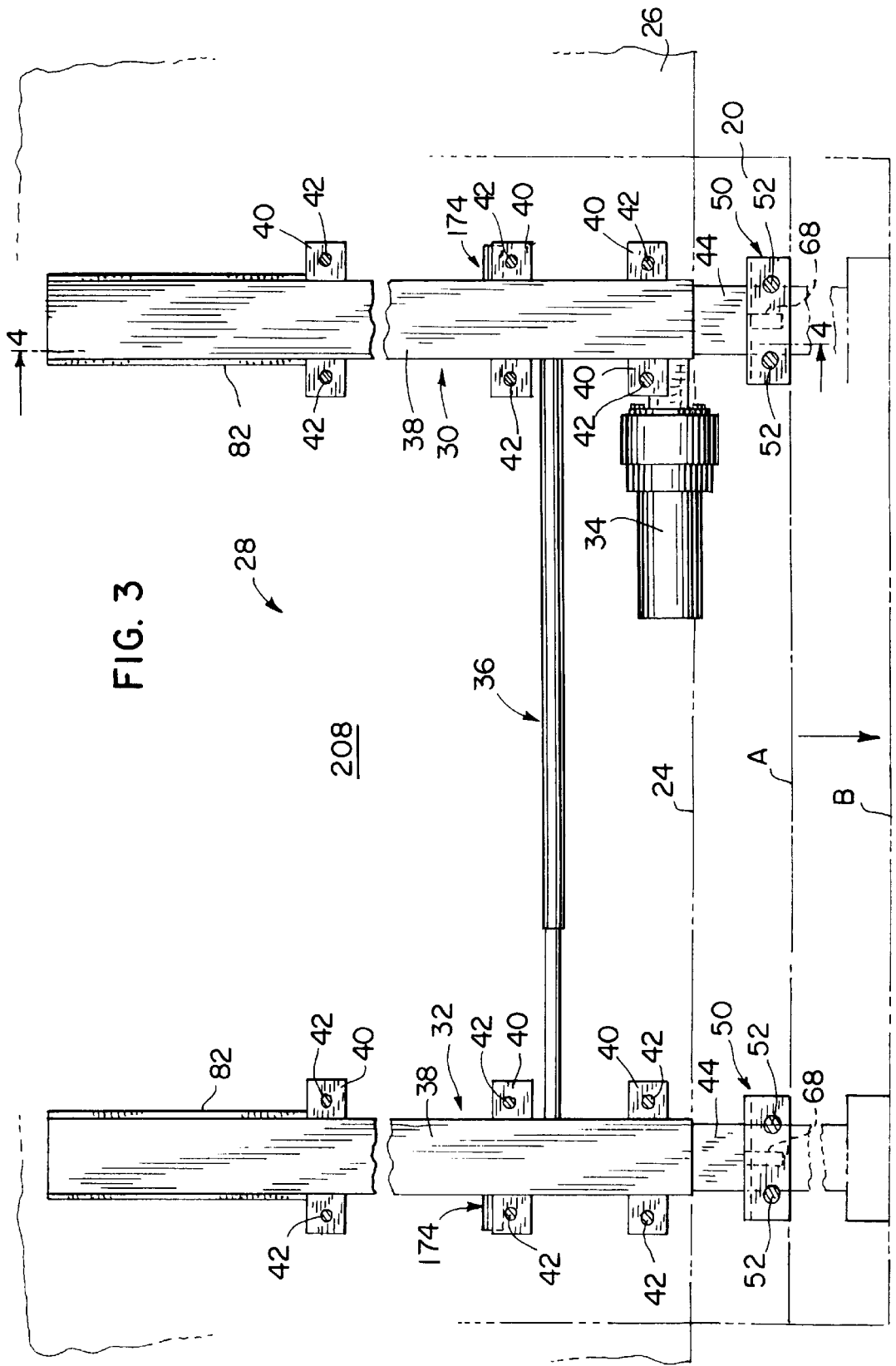
FIG. 3 is a plan view of the low profile, slide-out operating mechanism of the present invention showing in phantom lines various operating positions of the slide-out mechanism during extension.

Still referring to FIG. 3, an operating mechanism 28 for selectively extending and retracting the slide-out section 12 of the vehicle body 8 comprises a pair of substantially parallel, elongated drive and idler rail assemblies 30, 32, respectively, which extend generally perpendicularly to front wall 16 of slide-out section 12. As will be further appreciated hereafter, the operating mechanism 28 defines a master-slave arrangement in which an automatic motive device 34 is connected to drive rail assembly 30 for supplying rotary movement to a drive shaft assembly 36 interconnected between the drive and idler rail assemblies 30, 32 in a manner such that slide-out floor 20 will move relative to stationary room floor 26.

Each of the rail assemblies 30, 32 includes an outer rail 38 which is supported from and anchored to fixed floor 26 of stationary room section 10 by a series of braces 40 and fasteners 42 spaced along the length of each outer rail 38. Slidably carried for longitudinal movement in each of the outer rails 38 is an inner rail 44 for supporting slide-out section 12 thereon. Each of the inner rails 44 has an inner end 46 confined within one of the outer rails 38 and an outer end 48 (FIG. 4) adapted for attachment by a bracket and fastener arrangement 50 to the slide-out section 12.

As best illustrated in FIG. 4, each bracket and fastener arrangement 50 comprises a pair of substantially parallel, vertically oriented shafts 52 which are inserted through openings in the outer end of slide-out floor 20. Shafts 52 are held in place by washers 54 and nuts 56 threaded thereon which abut against the upper and lower surfaces of the slide-out floor 20. The shafts 52 include lower portions 58 which pass through apertures formed in a horizontally oriented wall 60 of an L-shaped bracket 62 supported in position by nuts 64 threaded thereon above and below the wall 60. A vertically oriented wall 66 of L-shaped bracket 62 extends downwardly against the outer end 24 of stationary room floor 26 and each outer rail 38 connected thereto when slide-out room floor 20 is in its fully retracted position. A horizontally oriented threaded shaft 68 disposed between vertical shafts 52 passes through a hole in bracket wall 66 and is held in place by a nut 69 threaded thereon to present an end portion 70 which is welded at 72 to the outer end 48 of each inner rail 44. With this arrangement, sliding movement of inner rails 44 will result in commensurate horizontal travel of slide-out floor 20 relative to the fixed floor 26 and outer rails 38 connected thereto.

Figure 7:
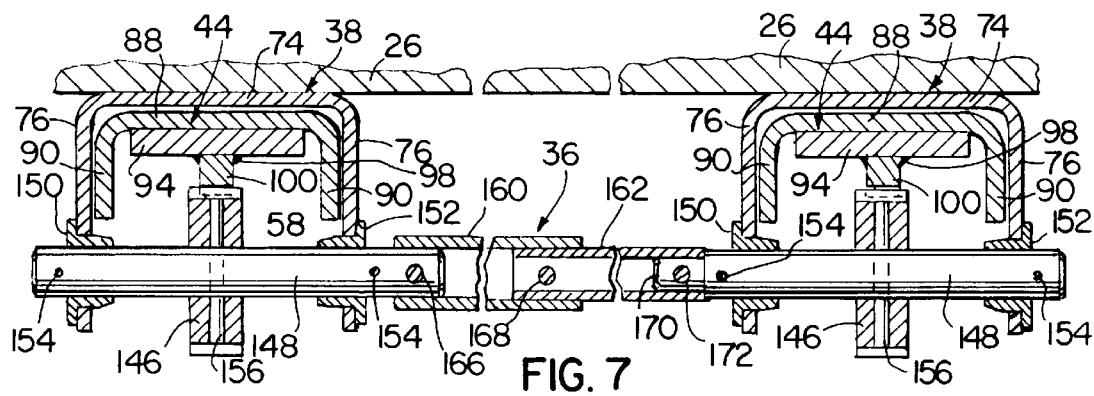
FIG. 7 is an enlarged partial, sectional view taken on line 7—7 of FIG. 4, and showing the drive gear arrangement of the low profile, slide-out operating mechanism of FIG. 3.
Figure 8:
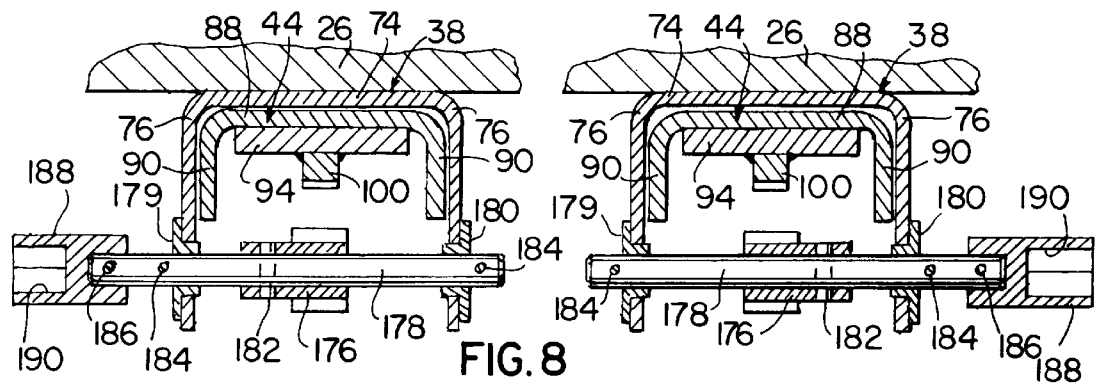
FIG. 8 is an enlarged partial, sectional view taken on line 8—8 of FIG. 4, and showing the override gear arrangement of the low profile slide-out operating mechanism of FIG. 3.
Figure 9:
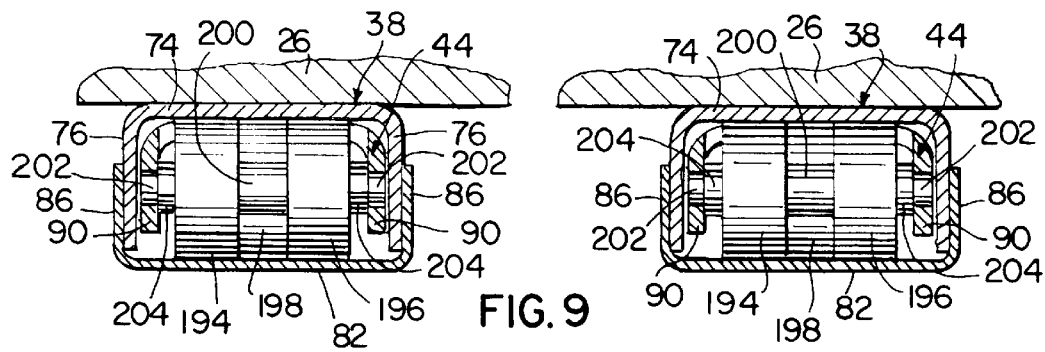
FIG. 9 is an enlarged partial, sectional view taken on line 9—9 of FIG. 4, and showing the upper roller arrangement of the low profile slide-out operating mechanism of FIG. 3.

With further reference to FIGS. 5–9, each outer rail 38 is an inverted U-shaped channel having a top wall 74 and a pair of depending sidewalls 76. Referring back at FIG. 4, each outer rail sidewall 76 includes an outer mounting portion 78 which extends downwardly at the outer end 67 of each outer rail 38, and a foreshortened inner portion 80 which extends along substantially the entire remaining length of outer rail 38 and carries a U-shaped belly pan 82. Outer rail top wall 74 is supported against the underside of fixed floor 26 by braces 40 described above. Outer rail side walls 76 in outer mounting portion 78 are formed with openings into which a pair of alignable bushings 84, 85 are press-fitted (FIG. 5), while sidewalls 76 of inner portion 80 serve to anchor side walls 86 of belly pan 82 (FIG. 9).

Each inner rail 44 is also an inverted U-shaped channel nested compactly within a respective outer rail 38 and includes a top wall 88 which is slidably disposed beneath top wall 74 of outer rail 38, and depending sidewalls 90 located inwardly of outer rail sidewalls 76. As seen in FIG. 4, inner rail top wall 88 terminates inwardly at 92, while inner rail sidewalls 90 continue rearwardly until inner end 46 is reached. As illustrated in FIGS. 5–8, the length of outer rail sidewalls 76 in outer mounting portion 78 is substantially longer than the length of inner rail sidewalls 90 in order to establish a mounting surface for a meshing rotatable gear arrangement 102 located at the outer end of each outer rail 38.

A flat, horizontally oriented support rail 94 is welded at 96 (FIG. 5) to the bottom of each inner rail top wall 88 along substantially the entire length thereof. As seen in FIGS. 7 and 8, each support rail 94 is welded at 98 to a downwardly depending gear rack 100 for engagement with an associated gear of meshing rotatable gear arrangement 102. Referring to FIG. 4, gear arrangement 102 includes an input gear 118, an idler gear 134, a drive gear 146 and an override gear 176 to be described hereafter. Gear rack 100 has an inner, gear-engaging end 104 which is positioned beneath the inner ends of each inner rail top wall 88 and support rail 94, and an outer, gear-engaging end 106 which is foreshortened relative to the outer ends 48 of overlying inner rail 44 and support rail 94. By eliminating the bottom walls of prior art outer rails and inner rails in favor of the nested, inverted U-shaped channels described above, the gear racks 100 can be raised to a more desirable, higher position for a reason to be appreciated hereafter.

Each input gear 118, idler gear 134, drive gear 146 and override gear 176 is rotatably mounted on outer mounting portion 78 of each outer rail 38 upon respective rotatable stub shafts extending between the sidewalls 76 of outer rails 38. Each of the meshing gears has a rotational axis lying in a substantially horizontal plane passing through the center of each meshing gear.

With particular attention to FIGS. 4 and 5, the inner rails 44 are slidably supported in outer rails 38 by means of a lower roller arrangement 108 rotatably mounted at the outer end 67 of each outer rail 38. Each lower roller arrangement 108 in the drive rail assembly 30 and the idler rail assembly 32 is comprised of a pair of large rollers 109, 110 mounted for free rotation on an input stub shaft 112 extending between sidewalls 76 of outer mounting portion 78, passing through suitable openings and rotatably supported by bushings 84, 85. Input stub shafts 112 are retained in axial position by retaining pins 116 which pass transversely through the input stub shaft ends outside the bushings 84, 85. Each of the rollers 109, 110 is in continuous rolling engagement with the underside of each support rail 94, and is disposed between the inside surfaces of each bushing 84, 85 and an outside surface of a drive or input gear 118 fixedly joined to each input stub shaft 112 by a central pin 120 passing transversely therethrough.

In order to drive input gear 118, the slide-out operating mechanism 28 relies upon the automatic motive device 34 preferably in the form of an integral electric gear motor-brake such as the type manufactured by Stature Electric, Inc. of Watertown, N.Y. its model number 5078-010. Motor-brake 34 is described in copending application Ser. No. 08/563,043. In the preferred embodiment, motor-brake 34 is mounted on the inside of drive rail assembly 30, so as to prevent interference with the frame members or other components of the vehicle. However, it should be understood that, if desirable, motor-brake 34 can also be positioned on the outside of drive rail assembly 30. As shown in FIG. 5, the inner end of input stub shaft 112 on drive rail assembly 30 is joined for rotation with and to the output shaft 122 of motor-brake 34 by a cylindrical motor coupling 124 through which respective retaining pins 126 transversely extend. Further joined around the coupled ends of input stub shaft 112 and output shaft 122 is a cylindrical brace 128 which extends over the innermost bushing 85 and joins the outer rail sidewall 76 to a face plate 130 of motor-brake 34 retained in position by bolts 132.

Figure 6:
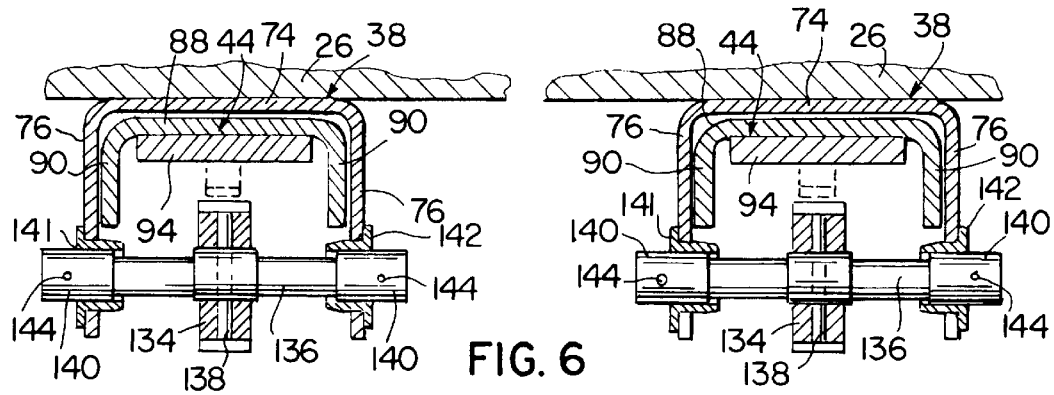
FIG. 6 is an enlarged partial, sectional view taken on line 6—6 of FIG. 4, and showing the idler gear arrangement of the low profile slide-out operating mechanism of FIG. 3.

Turning now to the combination of FIGS. 4 and 6, each input gear 118 is in meshing engagement with an idler gear 134 fixed for rotation by a central pin 138 on an idler stub shaft 136 extending between outer rail sidewalls 76 on outer mounting portion 78. The ends of each idler stub shaft 136 are provided with cylindrical sleeves 140 which pass through suitable openings and are rotatably supported by bushings 141, 142. Idler stub shafts 136 are retained from sliding axially out of the bushings 141, 142 by another set of retaining pins 144 which pass transversely through the sleeves 140 and idler stub shaft ends outside the bushings 141, 142.

Looking next at FIGS. 4 and 7, each idler gear 134 is in meshing engagement with a drive gear 146 which is mounted for rotation with and upon a drive stub shaft 148 extending between outer rail sidewalls 76 of outer mounting portion 78, passing through suitable openings and rotatably supported by bushings 150, 152. Drive stub shafts 148 are retained in position by retaining pins 154. Each drive gear 146 is maintained in position along drive stub shaft 148 by a transverse pin 156 such that the gear teeth 158 on the periphery of drive gear 146 engage the gear rack 100 so as to provide a means for selectively moving each inner rail 44 and slide-out floor 20 attached thereto. It should be understood that drive gears 146 are the only gears of meshing rotatable gear arrangement 102 to engage gear rack 100.

As can be appreciated, inner rail 44 is nested within outer rail 38, and likewise rollers 109, 110 and gears 118, 134 and 146 are nested within inner rail 44. With this arrangement, drive gear 146 extends into the channel defined by inner rail 44 for engaging gear rack 100, which provides an extremely compact arrangement for the entire assembly.

As previously noted and shown in FIG. 3, drive shaft assembly 36 extends between the drive and the idler rail assemblies 30, 32. Drive shaft assembly 36 comprises each of the drive stub shafts 148, as well as a telescopic coupling arrangement formed by a first tubular drive shaft element 160, and a second tubular drive shaft element 162. As seen in detail in FIG. 7, the inner end of drive stub shaft 148 of idler rail assembly 32 is slidably received in one end of first tubular element 160 and held in position by transverse retainer 166. The other end of first tubular element 160 telescopically receives one end of the second tubular element 162 which is restrained from sliding motion by transverse retainer 168. The other end of second tubular element 162 slidably accommodates a reduced portion 170 on the inner end of drive stub shaft 148 of drive rail assembly 30 which is confined within the second tubular element 162 by transverse retainer 172. Drive shaft assembly 36 is particularly advantageous in accommodating various spans between the drive and idler rail assemblies 30, 32, which must be selectively placed relative to the undercarriage of the vehicle to avoid the vehicle frame members and other components. Drive shaft assembly 36 is supported for rotation parallel to the input stub shafts 112 and idler stub shafts 136.

When the motor-brake 34 is operated, drive shaft assembly 36 translates a driving rotational force from the drive rail assembly 30 to the idler rail assembly 32 in a master-slave fashion in order to provide a balanced extension and retraction of slide-out section 12 relative to stationary room section 10. That is, rotation of motor output shaft 122 will turn stub shaft 112 and input gear 118 of drive beam assembly 30, which will turn stub shaft 136 and idler gear 134 to rotate drive gear 146 and stub shaft 148, which in turn rotates drive shaft assembly 36 to rotate drive gear 146 of idler beam assembly 32. Engagement of gear rack 100 with drive gear 146 enables inner rails 44 to be moved in sliding fashion relative to outer rails 38 to effect movement of slide-out section 12. When operation of motor-brake 34 is stopped, its brake automatically and positively clamps the output shaft 122 of motor-brake 34 against further rotation, thus positively fixing the position of slide-out section 12. This type of motor-brake 34 is quiet and typically draws little current yet provides responsive action with minimum battery drain in the electrical system of the vehicle. Prior art motor devices simply cut power to stop the extension or retraction of the slide-out section 12, which could cause unnecessary over-travel and imprecise control of the slide-out section 12 by inertial rotation of the motor output shaft. In contrast, the integral motor-brake 34 positively yet smoothly stops and locks the slide-out section 12 in its desired position after motor shut-off whether or not it is fully extended or retracted. The brake portion of motor-brake 34 also functions to positively maintain slide-out section 12 in its fully retracted position during travel of the vehicle, and also functions to prevent slide-out section from moving away from its fully extended position when section is extended to maintain a positive seal between the vehicle body and slide-out section. A further advantage in this design exists in transmission via the drive shaft assembly 36 to each side of the operating mechanism 28 to ensure proper synchronism which enables binding and channeling to be minimized.

In operation, input gear 118 and idler gear 134 of idler beam assembly 32 function only to impart rotation to rollers 109, 110 in response to the driving of drive gear 146 through drive shaft assembly 36, which would otherwise result from extension of inner rail 44 even if rollers 109, 110 were not driven. However, the substantially identical construction of idler beam assembly 32 and drive beam assembly 30 enables the vehicle manufacturer to place motor-brake 34 on either side of operating mechanism 28 for driving either beam assembly, thus further enhancing the flexibility in installation of mechanism 28.

The operating mechanism 28 contemplates an adjustable manual override arrangement 174 generally depicted in FIG. 3. In the event the motor-brake 34 is inoperable, the slide-out section 12 may still be operated by means of the manual override arrangement 174 conveniently accessible preferably at locations outside the drive and idler rail assemblies 30, 32. As seen in more detail in FIGS. 4 and 8, each drive gear 146 is in meshing engagement with a smaller override gear 176 which is mounted for rotation with and upon an override stub shaft 178 extending between outer rail sidewalls 76 of outer mounting portion 78, passing through suitable openings and rotatably supported by bushings 179, 180. Each override gear 176 is maintained centrally in position on its override stub shaft 178 by an elongated pin 182 extending transversely through override stub shaft 178 and into override gear 176. Retaining pins 184 pass transversely through the ends of each override stub shaft 178 to prevent each override stub shaft 178 from sliding axially relative to the bushings 179, 180. Like input gears 118 and idler gears 134, override gears 176 are spaced from and out of contact with gear rack 100. Retained in position by pins 186 at the outer end of each override stub shaft 178 is a tubular adapter 188 having an outwardly facing socket 190 formed therein. Socket 190 is suitably shaped to receive the mating end of a hand crank, ratchet wrench or other tool (not shown). Rotation of the crank or wrench when fitted in the adapter 188 will rotate each override gear 176 which, in turn, will rotate each drive gear 146 and drive shaft assembly 36 in order to manually extend or retract slide-out section 12. Before manual rotation of override gear 176, drive gear 146 and drive shaft assembly 36 can be accomplished, it is necessary for the operator to disconnect output shaft 122 of motor-brake 34 from the input stub shaft 112 on the drive rail assembly 30. This is accomplished by first loosening bolts 132 on the face plate 130 of motor-brake 34 to remove cylindrical brace 128. Motor coupling 124 is then removed by extracting one or both of retaining pins 126 such that motor-brake 34 can be disengaged from input stub shaft 112 and removed to relieve the torque normally applied on input stub shaft 112 and input gear 118 when motor-brake 34 is in operative position of FIG. 5. Once the torque applied by motor-brake 34 is relieved, each set of input gears 118, idler gears 134, drive gears 146 and override gears 176 may be rotated in unison manually via crank or wrench so as to turn drive shaft assembly 36 causing the drive gears 146 to engage the gear racks 100 and position the slide-out section 12 inwardly and outwardly.

Alternatively, motor-brake 34 can be provided with a releasable brake mechanism which is manually operable by the user to release its braking action on motor input shaft 122. This enables the user to operate the manual override without having to disable the drive system as described above, thus simplifying the steps involved when operating the manual override.

Also, it should be appreciated that socket 188 could be positioned inboard of rail assemblies 30, 32 if desired by the manufacturer, so as to provide override access in a location most suitable to the particular construction of the vehicle.

It is to be noted here that, due to the nested configuration of outer and inner rails 38, 44, and the raising of gear racks 100, the gears of meshing rotatable gear arrangement 102, stub shafts 112, 136, 148, 178, drive shaft assembly 36, and motor-brake 34 which are disposed adjacent thereto may likewise be elevated and located at an outer end of each outer rail in a manner which will minimize the vertical space occupied by such components beneath the vehicle. In other words, as seen in FIG. 5, the aforementioned components are condensed between an upper horizontal plane $P_1$ formed by the fixed floor 26 and a parallel, lower horizontal plane $P_2$ passing along the bottom of motor-brake 34 to define a low profile slide-out operating mechanism 28 positioned directly beneath the fixed floor 26 of vehicle 8.

In order to complement the lower roller arrangement 108 rotatably mounted at the outer end 67 of outer rails 38, the operating mechanism 28 further includes an upper roller arrangement 192 rotatably mounted at the inner end 46 of each inner rail 44. Referring to FIGS. 4 and 9, each upper roller arrangement 192 comprises a set of three rollers 194, 196, 198 having substantially equal diameters which are somewhat smaller than the diameters of rollers 109, 110 in lower roller arrangement 108. Two of the rollers 194, 196 are positioned on either side of a central bushing 200 mounted for rotation on a first roller shaft 202, the recessed ends of which are mounted in apertures formed in the sidewalls 90 in each inner rail 44. Spacers 204 are provided between the outside surface of each roller 194, 196 and the inner surface of each inner rail sidewall 90. The remaining or middle roller 198 is partially interposed between the rollers 194, 196 and mounted for rotation on a second roller shaft 206 located parallel to and forwardly of first roller shaft 202 and having ends mounted in other apertures provided in the sidewalls 90 of inner rails 44. As should be appreciated, each of the rollers 194, 196, 198 is in continuous rolling contact with the underside of outer rail top wall 74 as inner rail 44 is extended, due to the weight of slide-out section 12 bearing on the outer end of inner rail 44 and tending to pivot inner rail 44 on outer roller arrangement 108 in a clockwise direction (FIG. 4). As the slide-out section 12 moves inwardly and the weight of slide-out section 12 outward of outer roller arrangement 108 is relieved, inner rail 44 will tend to pivot counterclockwise on roller arrangement 108 to exert a downward force on rollers 194, 196, 198. Rollers 194, 196, 198 of upper roller arrangement 192 will then be supported by belly pan 82 so as to prevent any rocking motion while the rollers 109, 110 of lower roller arrangement 108 remain in supportive contact with the underside of support rail 94. The upper roller arrangement 192 and lower roller arrangement 108 thus provide vertical support for slide-out section 12 when retracted and simultaneously permit low friction in and out telescopic movement of slide-out section 12 relative to vehicle body. The upper roller arrangement 192 and lower roller arrangement 108 also function to prevent side-to-side movement of stationary room and slide-out room floors 20, 26 during longitudinal movement thereof.

In operation, slide-out section 12 and slide-out floor 20 function as follows. With reference to FIGS. 3 and 4, slide-out section 12 is normally telescoped inside stationary room section 10 when the vehicle is in transit. In this position, slide-out floor 20 is disposed above stationary room floor 26 with upper rollers 194, 196, 198 bearing the load of support rails 94, inner rails 44 and slide-out floor 20, and lower rollers 109, 110 bearing against the underside of top wall 74 of each outer rail 38. With the vehicle parked and leveled, inner rails 44 are telescoped out of outer rails 38 using the slide-out operating mechanism 28 of the present invention to commence outward movement of slide-out section 12 relative to stationary room 10 and thereby sliding movement of slide-out floor 20 relative to stationary room floor 26. As slide-out section 12 is moved further outward to continue outer movement of slide-out floor 20, each gear rack 100 will remain in contact with its respective drive gear 146 and will pass unobstructedly over idler gears 134 and input gears 118 between rollers 109, 110 of lower roller arrangement 108. During this outer movement, rollers 109, 110 prevent each gear rack 100 from contacting idler gears 134 and input gears 118, and rollers 194, 196, 198 of upper roller arrangement 192 bear against the underside of outer rail top walls 74.

With this arrangement, it should be appreciated that the above-described operating mechanism 28 defines a relatively unobstructed space 208 beneath the vehicle having adequate head room to access storage compartments located rearwardly of the drive shaft assembly 36. Additionally, a better pathway to inspect and service the motor-brake 34 or access the override arrangement 174 is created. The combination of the nested U-shaped outer and inner channels 38, 44, the raised gear racks 100, and the elevated positioning of meshing rotatable gear arrangement 102, stub shafts 112, 136, 148, 178, drive shaft assembly 36, and motor-brake 34 define a low profile operating mechanism which will enable smooth, uniform and responsive movement of a slide-out room 12 relative to a vehicle body 8.

While the invention has been described with reference to a preferred embodiment, those skilled in the art will appreciate that certain substitutions, alterations and omissions may be made without departing from the spirit thereof. For example, it should be understood that the output shaft 122 of motor-brake 34 could alternatively be coupled to the drive gear stub shaft 148, and that drive shaft assembly 36 could extend between each input gear stub shaft 112. Accordingly, the foregoing description is meant to be exemplary only, and should not be deemed limitative on the scope of the invention set forth with following claims.

I claim:

1. In an operating mechanism for selectively extending and retracting a slide-out section of a vehicle body and having a pair of substantially parallel outer rails secured to the vehicle body and a pair of substantially parallel inner rails supporting the slide-out section thereon, each of the inner rails and each of the outer rails having respective top walls, sidewalls, and outer ends, each of the inner rails being slidably mounted for longitudinal movement within one of the outer rails and a drive arrangement for moving the inner rails into and out of the outer rails, the improvement comprising:

a gear rack supported from the top wall of the inner rails; and a multiple gear arrangement comprising a series of meshing gears rotatably secured to the outer ends of each of the outer rails and operably connected to the drive arrangement, a portion of the multiple gear arrangement being engageable with the gear rack, and each of the meshing gears having a rotational axis lying in a substantially horizontal plane passing through the center of each of the meshing gears;

wherein said multiple gear arrangement comprises:
an input gear;
an idler gear engageable with the input gear;
a drive gear engageable with the idler gear; and
an override gear engageable with the drive gear;

wherein the input gear, the idler gear, the drive gear and the override gear are each mounted for rotation on a respective stub shaft extending between the sidewalls of the outer rails.

2. The improvement of claim 1, including a support rail interposed between the top wall of the inner rail and the gear rack.

3. The improvement of claim 1, wherein the drive gear is the only gear of the multiple gear arrangement engageable with the gear rack.

4. The improvement of claim 3, including lower support rollers engageable with the support rail, each of the support rollers being mounted on a stub shaft of one of said gears between one of the sidewalls of the inner rail and said one of said gears.

5. The improvement of claim 1, including a belly pan attached to the sidewalls of each of the outer rails.

6. The improvement of claim 5, including upper support rollers engageable with the top wall of each of the outer rails when the slide-out section is extending, each of the upper support rollers being mounted on an upper support roller stub shaft secured in the sidewalls of each of the inner rails.

7. The improvement of claim 6, wherein the upper support rollers are engageable with the belly pan when the slide-out section is retracting.

8. The improvement of claim 1, wherein the sidewalls of each of the outer rails are longer than the sidewalls of each of the inner rails.

9. The improvement of claim 6, wherein the rotational axes of the input gear stub shaft, the idler gear stub shaft, the drive gear stub shaft, the override gear stub shaft, and the upper support roller stub shaft are all parallel to each other.

10. The improvement of claim 1, wherein the drive arrangement is comprised of an electric gear motor-brake having an output shaft coaxially secured to the respective stub shaft of the input gear.

11. The improvement of claim 1, wherein the drive arrangement comprises a shaft coaxially secured to the respective stub shaft of the override gear, said shaft being engageable by a tool so as to manually rotate said override gear.

12. A master-slave operating mechanism for selectively extending and retracting the slide-out section of a vehicle body, the mechanism comprising:

a pair of substantially parallel, inverted U-shaped outer channels secured to the vehicle body, each of the outer channels having a top wall and depending sidewalls, the depending sidewalls defining a mounting surface at an outer end of each outer rail;

a pair of substantially parallel, inverted U-shaped inner channels for supporting the slide-out section thereon, each of the inner channels having a top wall disposed beneath the top wall of each outer channel and depending sidewalls positioned inside each of the depending sidewalls of each outer channel, the depending sidewalls of each inner channel being shorter than the depending sidewalls of each outer channel;

a gear rack fixed to the top wall of each of the inner channels;

an input gear mounted for rotation with and upon an input stub shaft rotatably mounted on each mounting surface;

an idler gear in meshing engagement with the input gear and mounted for rotation with and upon an idler stub shaft rotatably mounted on each mounting surface;

a drive gear in meshing engagement with the idler gear and mounted for rotation with and upon a driven stub shaft rotatably mounted on each mounting surface the drive gear being engageable with the gear rack;

a drive shaft assembly extending between each of the drive gears; and a drive arrangement for rotating one of the input gears so as to rotate one of the drive gears, the drive shaft assembly transmitting the rotational movement of the one drive gear to the other drive gear causing the simultaneous rotation of the drive gears against the gear racks and enabling the inner rails to slide into and out of the outer rails thereby extending and retracting the slide-out section.

13. The master-slave operating mechanism of claim 12, including an override gear in meshing engagement with the drive gear and mounted for rotation with and upon an override stub shaft rotatably mounted on each mounting surface.

14. An operating mechanism for selectively extending and retracting a slide-out section of a vehicle body, the mechanism comprising:

a pair of substantially parallel outer rails secured to the vehicle body;

a pair of substantially parallel inner rails for supporting the slide-out section thereon, each of the inner rails being slidably mounted for longitudinal movement relative to one of the outer rails;

rollers supporting each of the inner rails for facilitating longitudinal sliding movement of the inner rails relative to the outer rails said rollers including a pair of rollers aligned coaxially along a roller axis and separated axially by a space between them, said roller axis being generally perpendicular to a longitudinal extent of said inner rail and displaced from rolling surfaces of said inner rail by a distance approximately equal to a radius of said rollers so that said rollers support said inner rail by rolling on said rolling surfaces; and a drive arrangement including a gear rack mounted to at least one of the inner rails and disposed thereon in alignment with said space between said rollers a drive gear engageable with the gear rack and extending from an axis of said drive gear to a point of engagement with said gear rack in generally the same direction as said rollers extend from said roller axis to a point of contact with said rolling surfaces, and a device entrained to rotate the drive gear to drive the gear rack and thereby remove the inner rail longitudinally relative to the outer rail;

wherein each said inner rail is an inverted u-shaped channel and said gear rack is disposed inside said channel with an engagement surface of said rack and said rolling surfaces facing downwardly.

15. The operating mechanism of claim 14, wherein the drive arrangement comprises a meshing multiple gear arrangement rotatably secured to at least one of the outer rails.

16. The operating mechanism of claim 15, wherein the device for rotating the drive gear comprises an automated motive device.

17. The operating mechanism of claim 15, wherein the device for rotating the drive gear comprises an override gear engageable by a manually rotatable tool.

18. The operating mechanism of claim 15, wherein the multiple gear arrangement comprises:

an input gear;

an idler gear engageable with the input gear;

a drive gear engageable with the idler gear; and an override gear engageable with the drive gear.

19. The operating mechanism of claim 14, wherein said drive gear extends upwardly into said channel to engage said engagement surface of said rack.

20. The operating mechanism of claim 14, including a support rail interposed between a top wall of said inner rail and said gear rack.

21. The operating mechanism of claim 14, wherein said rollers extend into said channel and said rolling surfaces are inside said channel alongside said gear rack.

* * * * *

UNITED STATES PATENT AND TRADEMARK OFFICE
CERTIFICATE OF CORRECTION

PATENT NO. : 6,116,671
DATED : September 12, 2000
INVENTOR(S) : Robert H. Schneider Page 1 of 1

It is certified that error appears in the above-identified patent and that said Letters Patent is hereby corrected as shown below:

Field 63, delete "Continuation-in-part of application No. 08/563,043, Nov. 27, 1995, Pat. No. 5,758,918."

Column 1,
Lines 5 and 6, delete "CROSS REFERENCE TO RELATED APPLICATIONS"
Lines 8-11, delete "This is a continuation-in-part of U.S. patent application Ser. No. 08/563,043 filed Nov. 27, 1995, which issued as U.S. Pat. No. 5,758,918 entitled "Vehicle Room Slide-Out Operating Mechanism" on Jun. 2, 1998."

Signed and Sealed this

Third Day of July, 2001

*Attest:*

*Nicholas P. Godici*

*Attesting Officer*

NICHOLAS P. GODICI
*Acting Director of the United States Patent and Trademark Office*